United States Patent [19]

Rust et al.

[11] 4,008,176
[45] Feb. 15, 1977

[54] PROCESS FOR THE MANUFACTURE OF A CATALYST

[75] Inventors: Kurt Rust, Frankfurt am Main; Erwin Schrott, Sulzbach, Taunus; Helmut Strametz, Frankfurt am Main; Hans-Jurgen Kablitz, Liederbach, Taunus, all of Germany

[73] Assignee: Hoechst Aktiengesellschaft, Frankfurt am Main, Germany

[22] Filed: Feb. 27, 1975

[21] Appl. No.: 553,811

[30] Foreign Application Priority Data

Jan. 30, 1975   Germany .......................... 2503689

[52] U.S. Cl. ............................. 252/429 B; 526/159
[51] Int. Cl.² ............................................. C08F 4/64
[58] Field of Search ............................... 252/429 B

[56] References Cited

UNITED STATES PATENTS

| | | | |
|---|---|---|---|
| 2,914,515 | 11/1959 | Stuart | 252/429 B X |
| 3,029,231 | 4/1962 | van Amerongen | 252/429 B X |
| 3,058,970 | 10/1962 | Rust et al. | 252/429 B X |
| 3,394,118 | 7/1968 | Boor | 252/429 B X |
| 3,864,278 | 2/1975 | LaHeij et al. | 252/429 B |

*Primary Examiner*—Patrick P. Garvin
*Attorney, Agent, or Firm*—Curtis, Morris & Safford

[57] ABSTRACT

A catalyst of high activity and stereospecificity in α-olefin polymerization is obtained when titanium trichloride, prepared from titanium tetrachloride by reduction with an aluminum alkyl halide, is thermally treated, first with an ether in the presence of a cyclopolyene and the solid reaction product is then treated with an aluminum alkyl halide in the presence of a small amount of a cyclopolyene and/or an olefin. With the catalyst obtained high space-time yields of α-olefin polymers and copolymers can be produced.

10 Claims, No Drawings

PROCESS FOR THE MANUFACTURE OF A CATALYST

The present invention relates to a process for the manufacture of a catalyst suitable for the polymerization of α-olefins.

In the polymerization of propylene or higher α-olefins with Ziegler type catalysts there are obtained, besides the technically very interesting highly crystalline polymers, which are insoluble or sparingly soluble in the hydrocarbons used as dispersion media under the polymerization conditions, also, amorphous, readily soluble polymers, and oils. According to Natta, the highly crystalline polymers are sterically ordered and are called "isotactic", while the soluble polymers are sterically disordered and are called "atactic".

The formation of isotactic and amorphous poly-α-olefins is regulated by the catalyst system. For an economically useful process catayst systems having a selective action are required, which lead exclusively or almost exclusively to the formation of the desired polymers.

A process has become known (British Pat. No. 895,595) according to which the selectivity of catalysts of the aforesaid type can be considerably improved with respect to the formation of polymers with high content of isotactic fraction by subjecting the reaction product of $TiCl_4$ and halogen-containing aluminum-organic compounds to a thermal treatment at a temperature in the range of from 40° to 150° C and after the treatment optionally washing the product several times with an inert solvent. This heat treated and washed catalyst is then activated in the olefin polymerization with fresh diethyl aluminum monochloride. The efficiency of the heat treated catalyst can be further improved by effecting the thermal treatment in the presence of complex forming compounds or compounds forming double salts, for example ethers and sodium chloride.

There have also been described catalytic complexes having a high activity and stereospecificity in the polymerization of α-olefins (cf. German Offenlegungsschrift 2,213,086). These complexes are formed by reduction of titanium tetrachloride with an aluminum-organic compound, thermal treatment of the solid reaction product in the reaction medium, separation of the solid and treating it with an electron donor, especially an ether, preferably diisoamyl ether, washing the reaction product and reacting it with titanium tetrachloride. The catalytic complexes are isolated by a third washing process. The preparation of the catalytic complexes is thus rather complicated and expensive as large amounts of wash solutions have to be worked up (cf. published documents of Belgian Pat. No. 784,495). In the working up of the wash solutions to recover the ether, large amounts of titanium-containing waste water are obtained.

The present invention provides a process for the manufacture of a catalyst suitable for α-olefin polymerization by reacting titanium tetrachloride in an inert hydrocarbon solvent with an aluminum-organic compound containing an aluminum dialkyl chloride, separating and washing the reaction product and thermally treating the reaction product suspended in the hydrocarbon solvent in the presence of an ether (component A), mixing with an aluminum dialkyl halide (component B) and optionally with a cyclopolyene as stereoregulator (component C), which comprises adding the aluminum-organic compound containing aluminum dialkyl chloride to the $TiCl_4$ at a temperature of from −20° to +20° C in a molar proportion of aluminum dialkyl chloride to $TiCl_4$ of from 0.8 : 1 to 1.5 to 1, subjecting the suspension containing the solid washed reaction product to a thermal treatment in the presence of a dialkyl ether and a cyclopolyene and after-treating the suspension with an aluminum alkyl halide optionally in the presence of a small amount of a cyclopolyene and/or an olefin.

The invention also relates to the catalyst prepared by the afore described process and to its use in the polymerization of α-olefins.

To prepare the catalyst in accordance with the invention titanium tetrachloride is first reacted in an inert hydrocarbon solvent with an aluminum-organic compound containing an aluminum dialkyl chloride.

The aluminum-organic compound containing an aluminum dialkyl chloride to be used is either an aluminum dialkyl chloride carrying alkyl groups with 1 to 6 carbon atoms, preferably aluminum diethyl chloride, dipropyl chloride, diisopropyl chloride, diisobutyl chloride, more preferably aluminum diethyl chloride, or an aluminum alkyl sesquichloride, i.e. an equimolecular mixture of aluminum dialkyl-monochloride and aluminum alkyl dichloride, preferably aluminum ethyl sesquichloride, propyl sesquichloride, isopropyl sesquichloride, or isobutyl sesquichloride, aluminum ethyl sesquichloride being particularly preferred.

In the reaction of titanium tetrachloride and the aluminum-organic compound containing an aluminum dialkyl chloride the molar proportion of aluminum dialkyl chloride to titanium tetrachloride is in the range of from 0.8 : 1 to 1.5 : 1, preferably 0.9 : 1 to 1.1 : 1. The aluminum compound is added to the dissolved titanium tetrachloride at a temperature of from −20 to +20° C, preferably 0° to 5° C.

As solvent an alkane or cycloalkane that is liquid at the reaction temperature is preferably used, for example hexane, heptane, octane, cyclohexane, or a hydrocarbon mixture for example a gasoline fraction boiling in the range of from 130 to 170° C, or a solvent as generally used for the polymerization of α-olefins. The amount of solvent is preferably chosen in such a manner that a 40 to 60% by weight solution of the titanium tetrachloride and a 15 to 25% by weight solution of the aluminum-organic compound are used.

The formed $TiCl_3$-containing solid reaction product is separated and freed from all soluble components by washing with the solvent used.

The reaction product is then again suspended in the solvent in an amount such that the concentration of titanium in the suspension is in the range of from 0.05 to 2.5 moles of $TiCl_3$, preferably 0.15 to 2.0 moles and especially 0.25 to 1.5 moles per liter of solvent, and subjected to a thermal treatment in the presence of a dialkyl ether and a cyclopolyene. The thermal treatment is carried out at a temperature of from 40° to 150° C, preferably 40° to 100° C and especially 60° to 90° C. Suitable dialkyl ethers are those having from 2 to 5 carbon atoms in each alkyl group, for example diethyl ether, di-n-propyl ether, diisopropyl ether, di-n-butyl ether, diisobutyl ether, preferably di-n-butyl ether. The molar proportion of titanium trichloride to dialkyl ether in the thermal treatment is preferably in the range of from 1 : 0.6 to 1 : 1.2, more preferably 1 : 0.9 to 1 : 1.

Suitable cyclopolyenes are norcaradiene and those having 7 ring members and 3 non cumulated double bonds in the ring as well as those having 8 ring members and 3 or 4 non cumulated double bonds in the ring, preferably cycloheptatriene-1,3,5, cyclooctatriene-1,3,5, and cyclooctatetraene-1,3,5,7, as well as the alkyl- and alkoxy-substituted derivatives thereof in which the alkyl group contains from 1 to 4 carbon atoms, cycloheptatriene-1,3,5 being preferred. The molar proportion of titanium trichloride to cyclopolyene is in the range of from 1 : 0.001 to 1 : 0.15, preferably 1 : 0.005 to 1 : 0.08 and more preferably 1 : 0.05 to 1 : 0.1.

The dialkyl ether is added to the suspension of the solid reaction product or vice versa. In the heat treatment the dialkyl ether can be dissolved in a solvent, it is more advantageous, however, not to dilute it. The dialkyl ether is added to the suspension or the suspension to the dialkyl ether at the temperature of the heat treatment over a period of a few seconds to 5 hours, preferably 1 to 30 minutes. Prior to the addition of the cyclopolyene the suspension is preferably treated for 1 to 45 and preferably 3 to 30 minutes with the ether alone. After mixing of the reaction components, the mixture is stirred for 5 to 300 and preferably 30 to 60 minutes at the temperature of the thermal treatment.

The solid reaction product is then treated, in the form of a suspension in the hydrocarbon, with an aluminum alkyl halide, optionally with prior separation of the mother liquor. For the treatment aluminum alkyl halides of the formula $AIR_nX_{3-n}$ in which R stands for an alkyl radical having from 2 to 8 carbon atoms, X represents a halogen atom and n is a number in the range of from 1 to 2 are used, preferably aluminum dialkyl halides, aluminum alkyl dihalides, and aluminum alkyl sesquihalides, more particularly aluminum diethyl chloride, aluminum ethyl dichloride and aluminum ethyl sesquichloride. A very economic method consists in using the mother liquor obtained in the preparation of the $TiCl_3$-containing reaction product and preponderantly containing aluminum alkyl dichlorides.

The molar proportion of aluminum alkyl halide to $TiCl_3$ in the suspension to be treated is in the range of from 0.8 : 1 to 10 : 1 and preferably 1 : 1 to 5 : 1 and the treatment is carried out at a temperature of from 0 to 60° C, preferably 20° to 40° C while stirring.

When the mother liquor is separated prior to the treatment with the aluminum alkyl halide, it is recommended to carry out said treatment in the presence of a cyclopolyene as specified above.

The molar proportion of titanium trichloride to cyclopolyene is in the range of from 1 : 0.001 to 1 : 1, preferably 1 : 0.005 to 1 : 0.8 and especially 1 : 0.075 to 1 : 0.5.

The after-treatment with the aluminum alkyl halide can also be carried out with advantage in the presence of a small amount of an olefin, either in the presence or in the absence of a cyclopolyene as defined above. There can be used monoolefins having from 2 to 10 carbon atoms, preferably ethylene, propylene, butene-1, or 4-methyl-pentene 1. The molar proportion of titanium trichloride to olefin is in the range of from 1 : 1 to 1 : 100, preferably 1 : 1 to 1 : 50 and more preferably 1 : 1.5 to 1 : 20.

When the after-treatment is carried out with an aluminum alkyl dihalide or aluminum alkyl sesquihalide the catalyst component A formed must be separated from the suspension and washed with an inert hydrocarbon solvent. With the use of an aluminum dialkyl monohalide, however, the isolation and washing of component A can be dispensed with. Moreover, in the latter case the amount of catalyst component B could be reduced by the amount of aluminum dialkyl monohalide used for the after-treatment.

After separation from the solvent by decantation or filtration, the catalyst component A can be dried with the exclusion of air and humidity and then stored.

Component A is used either in the form of a suspension, for example as obtained in the after-treatment with an aluminum alkyl halide, or it is isolated, washed, suspended in an inert hydrocarbon solvent and used together with an aluminum dialkyl halide (component B) in the polymerization of $\alpha$-olefins. It is also possible, of course, to use the dried catalyst component A per se.

$\alpha$-Olefins which can be polymerized with the catalyst of the invention are those of the formula $CH_2=_{CHR}$ in which R stands for an alkyl radical having from 1 to 8 carbon atoms, preferably propylene, butene-1, pentene-1, 3-methylbutene-1, 4-methyl-pentene-1 and 3-methyl-pentene-1, propylene being preferred. The catalyst according to the invention can be used for the homopolymerization as well as for the copolymerization of mixtures of the aforesaid olefins with one another and/or with ethylene. In the copolymerization the mixture contains at least 95% by weight of one of the $\alpha$-olefins and at most 5% by weight of ethylene, each time calculated on the total amount of the monomers. The catalyst is especially favorable for the polymerization of mixtures of propylene with small amounts of ethylene of from 0.5 to 5 and preferably 1.5 to 3% by weight. The catalyst of the invention can also be used for the block polymerization of the said $\alpha$-olefins with one another and/or with ethylene. In this case the content of ethylene is below 25% by weight. Block polymers of propylene and ethylene are preferably made. The block polymers made with the catalyst of the invention are characterized by a high hardness and an excellent impact strength at a temperature below 0° C.

The polymerization is carried out continuously or discontinuously in suspension or in the gaseous phase at a pressure of from 1 to 50 kg/cm$^2$, preferably 1 to 40 kg/cm$^2$.

The suspension polymerization is carried out in an inert solvent, for example a petroleum fraction poor in olefins and having a boiling point in the range of from 60° to 250° C which must be carefully freed from oxygen, sulfur compounds and humidity, or saturated aliphatic and cycloaliphatic hydrocarbons such as butane, pentane, hexane, heptane, cyclohexane, methylcyclohexane, or aromatic compounds such as benzene, toluene, and xylene. The suspension polymerization can advantageously be carried out also in the $\alpha$-olefin to be polymerized, for example liquid propylene, as dispersion medium.

It is likewise possible to carry out the polymerization in the absence of a solvent in the gaseous phase, for example in a fluidized bed.

If necessary, the molecular weight of the polymer is regulated by adding hydrogen.

The amount of catalyst component A depends on the intended reaction conditions, especially temperature and pressure. In general, 0.05 to 10 mmoles of $TiCl_3$ and preferably 0.1 to 3 mmoles, are used per liter of solvent in the suspension polymerization or per liter of reactor volume in the gas phase polymerization.

Catalyst component B is an aluminum dialkyl monochloride of the formula $AlR_2Cl$ in which R is an aliphatic hydrocarbon radical having up to 8 carbon atoms, preferably aluminum diethyl monochloride. The amount of component B is chosen in such a manner that the molar proportion of component B to component A (calculated on $TiCl_3$) is in the range of from 0.5 : 1 to 100 : 1, preferably 1 : 1 to 10 : 1.

The catalyst consisting of components A and B has a high polymerization activity and a good stereospecificity which largely depends on the polymerization temperature. When, for example, propylene is polymerized at 60° C the dispersion medium contains less than 3.0% by weight of soluble fractions, calculated on the total polymer, preferably less than 2.0% by weight. At a polymerization temperature of 70° to 80° C the undesired soluble fraction increases to up to 6% by weight. On the other hand, a higher polymerization temperature is desirable with respect to the dissipation of the polymerization heat.

It is known that with increasing pressure and, hence, at a higher polymerization rate, the amount of soluble fractions increases. When, for example, propylene is polymerized in liquid propylene under about 32 kg/cm² and at 70° C, up to 6% of soluble fractions are obtained.

When component A has been washed after the treatment with the aluminum alkyl halide, it is recommended to add a cyclopolyene as component C to carry out polymerization. Suitable cyclopolyenes are those specified above.

The molar proportion of component C to Component A, calculated as $TiCl_3$, is in the range of from 0.1 : 1 to 1 : 1, preferably 0.2 : 1 to 0.6 : 1.

The polymerization in the presence of the catalyst of the invention is carried out at a temperature of from 20° to 120° C, preferably 50° to 90° C. Higher temperatures are also possible but in this case a higher fraction of soluble atactic polymer is formed.

By the after-treatment according to the invention with an aluminum alkyl halide of the $TiCl_3$-containing reaction product thermally treated in the presence of a cheap aliphatic dialkyl ether and a cyclopolyene a catalyst component A is obtained which, already in combination with an aluminum dialkyl halide as activator (component B), considerably increases the polymerization rate of α-olefins with improved stereospecificity. As compared to the state of the art as disclosed in British Specification 895,595, the catalyst activity is over 100 % higher at the same polymerization temperature and pressure with an improved stereospecificity. Owing to the higher catalyst activity (g polymer per g catalyst) the same space-time-yield can be obtained with a smaller amount of catalyst, whereby the expensive further processing of the polymer is considerably facilitated or a processing under like conditions ensures a more efficient removal of the catalyst. When the polymerization is carried out under elevated pressure, for example above 20 kg/cm²˙ either in the gaseous phase or in liquid α-olefin, for example liquid propylene, the yields obtained are so high that a catalyst removal can be dispensed with (more than 1,000 g polymer per millimole $TiCl_3$).

As compared with the state of the art disclosed in German Offenlegungsschrift 2,213,086 the advantage of the process of this invention resides in the fact that the manufacture of the catalyst is cheaper for the following reasons:

1) At least one and possibly even two of the three intense washing processes can be dispensed with.

2) Lower investment and manufacturing costs for the working up of wash solutions.

3) Economy of material since the after-treatment according to the invention can be carried out with the mother liquor obtained in the preparation of the reduced $TiCl_3$-containing solid, or, when an aluminum dialkyl monohalide is used, the amount thereof can be deduced from the amount of activator (component B).

4) According to the state of the art the titanium tetrachloride used for the after-treatment is decomposed with water and neutralized whereby considerable amounts of waste water are formed, whereas practically no titanium-containing waste waters must be worked up in the manufacture of the catalyst according to the invention.

The following examples illustrate the invention.

EXAMPLE 1

A) Preparation of catalyst

A 1) Reduction of $TiCl_4$ with aluminum ethyl sesquichloride

With the exclusion of air and moisture a 10 liter vessel with stirrer was charged with 1,090 ml of a hydrogenated, oxygenfree gasoline fraction boiling at 140° – 165° C and 550 ml of titanium tetrachloride (5 moles) and at 0° C, while stirring under nitrogen (250 rev/min), a solution of 1111.2 g of aluminum ethyl sesquichloride containing 4.5 moles aluminum diethyl monochloride in 3334 g of the gasoline fraction was dropped in over a period of 8 hours. A red-brown fine precipitate separated. The mixture was stirred for another 2 hours at 0° C and then for 12 hours at room temperature.

The separated precipitate was allowed to settle and the supernatant mother liquor was separated by decantation and washed three times, each time with 2,000 ml of the gasoline fraction. The washed solid reaction product was suspended again in the gasoline fraction and the concentration of the suspension was adjusted to 2 moles $TiCl_3$/liter. The content of trivalent titanium in the suspension was determined by titration with a Ce-IV solution.

A 2) Thermal treatment of the $TiCl_3$-containing reaction product in the presence of di-n-butyl ether and cycloheptatriene-1,3,5

500 ml of the 2-molar suspension (corresponding to 1 mole $TiCl_3$) were heated to 80° C in a 2 liter vessel with stirrer, with the exclusion of air and humidity and under nitrogen, and at said temperature 161 ml di-n-butyl ether (0.95 mole) were dropped in while stirring over a period of 30 minutes. The suspension was kept at 80° C for a further 30 minutes, at said temperature 75 mmoles cycloheptatriene-1,3,5 (7.8 ml) were added and the mixture was stirred for 4 hours at 80° C. On adding the ether the mother liquor turned olive green.

For the further treatment the suspension was diluted to a $TiCl_3$ content of 0.5 mole/1. The content of trivalent titanium (as $TiCl_3$) was determined by titration with a Ce-IV solution.

A 3) After-treatment of the $TiCl_3$-containing reaction product with aluminum alkyl halides and a cyclopolyene With the exclusion of air and humidity 1 mmole ($TiCl_3$) of the above olive green suspension and 0.125 mmole cycloheptatriene-1,3,5 and 2 mmoles aluminum diethyl monochloride were added to 100 ml of the gasoline fraction and the mixture was stirred for 1 hour at room temperature.

B) Polymerization of propylene

A 1 liter glass autoclave was charged, with the exclusion of air and humidity, with 0.4 liter of a hydrogenated, oxygen-free gasoline fraction (b.p. 140° – 165°) and the gasoline was saturated with propylene at 55° C. 2 mmoles aluminum diethyl monochloride (activator, component B) and the after-treated $TiCl_3$ (1 mmole, suspension according to A 3) were added and hydrogen was introduced until a pressure of 0.25 kg/cm$^2$ had been reached. Then, over a period of 5 minutes propylene was introduced in an amount such that a pressure of 6 kg/cm$^2$ was obtained. During the course of polymerization this pressure was maintained by adding propylene. After a time of polymerization of 2 hours the pressure in the autoclave was released and the polymer suspension was filtered off with suction, the polymer on the filter was washed with 1 liter of hot solvent (70° C) and dried at 70° C under reduced pressure. 215.7 g polypropylene insoluble in the dispersion medium were obtained. The freely flowing pulverulent polymer had an apparent density of 540 g/l, an RSV value of 2.4 dl/g and a ball indentation hardness of 810 kg/cm$^2$ (DIN 53 456).

To determine the soluble fraction formed in the polymerization (atactic polypropylene) the mother liquor of the polymer suspension and the wash solutions were combined and evaporated to dryness under reduced pressure. 1.3 g of soluble polypropylene were found (0.6 %, calculated on total polymer).

EXAMPLE 2

Component A was prepared as described in Example 1 sub A 1) to A 3), but in the after-treatment of the $TiCl_3$-containing reaction product (A 2) cyclooctatetraene-1,3,5,7 was used instead of cycloheptatriene-1,3,5.

1 mmole ($TiCl_3$) of the olive green suspension, (A 2), 0.125 mmole cyclooctatetraene-1,3,5,7 and 2 mmoles aluminum diethyl monochloride were added to 100 ml of the gasoline fraction with the exclusion of air and humidity and the mixture was stirred for 1 hour at room temperature.

Propylene was polymerized under the conditions of Example 1 B. 238.8 g of polypropylene insoluble in the dispersion medium having an apparent density of 530 g/l, an RSV value of 2.5 dl/g and a ball indentation hardness of 840 kg/cm$^2$ (DIN 53 456) were obtained. The proportion of soluble polypropylene amounted to 1.2 g (0.5% calculated on total polymer).

EXAMPLE 3

Component A was prepared as described in Example 1 sub A 1) and A 2) and the $TiCl_3$-containing reaction product was subjected to an after-treatment with aluminum alkyl halide and a cyclopolyene in the presence of an olefin as follows:

100 mmoles of the $TiCl_3$ suspension A 2) were diluted to 0.1 mole $TiCl_3$ per liter dispersion medium by adding about 800 ml of the gasoline fraction and, with the exclusion of air and humidity, 500 mmoles $Al(C_2H_5)_2Cl$ (62.92 ml) and 32.5 mmoles cycloheptatriene-1,3,5 were added and the mixture was stirred for 5 minutes at room temperature. At room temperature (with cooling) 300 mmoles (12.6 g) of gaseous propylene (6.7 l) were then introduced over a period of 1 hour. To avoid the formation of a vacuum the propylene was diluted with a small amount of argon. Subsequently, the $TiCl_3$-containing suspension was stirred for 1 hour at room temperature and under argon. The content of trivalent titanium (as $TiCl_3$) was determined by titration with a Ce-IV solution.

A 1 liter glass autoclave was charged, with the exclusion of air and humidity, with 0.5 l of a hydrogenated, oxygen-free gasoline fraction (b.p. 140° – 165° C) and the hydrocarbon was saturated with propylene at 70° C. 1 mmole of the above suspension (10.9 ml) was added and hydrogen was introduced in an amount such that a pressure of 0.25 kg/cm$^2$ was reached. Over a period of 5 minutes propylene was then introduced until a total pressure of 6 kg/cm$^2$ had built up. This pressure was maintained during the course of polymerization by introducing propylene. Simultaneously, the temperature was increased to 80° C and maintained at said level by cooling. After a polymerization period of 2 hours the pressure in the autoclave was released and the polymerization mixture was worked up as described in Example 1 B. 215 g of polypropylene insoluble in the dispersion medium were obtained in the form of translucent grains. The RSV value was 1.9 dl/g, the apparent density 520 g/l and the ball indentation hardness 860 kg/cm$^2$ (DIN 53 456). In the mother liquor 3.6 grams of soluble atactic polypropylene were found, corresponding to 1.65% by weight, calculated on the total polymer.

EXAMPLE 4

Polymerization of propylene in the liquid monomer

A 16 l enamelled vessel provided with stirrer, jacket heating and gas inlet was flushed at room temperature with pure nitrogen and then with propylene. A pressure of 0.5 kg/cm$^2$ was built up by introducing hydrogen and through a valve a solution of 20 mmoles $Al(C_2H_5)_2Cl$ in 6 l of liquid propylene were added. Then through another valve 4 mmoles (as $TiCl_3$) of the suspension of component A of Example 3, containing 20 mmoles $Al(C_2H_5)_2Cl$, 1.6 mmoles cycloheptatriene-1,3,5 and a small amount of polypropylene, diluted with 6 l of liquid propylene were added. The polymerization mixture was heated to 70° C whereby the pressure rose to 32 kg/cm$^2$. The internal temperature was maintained at 70° C by cooling. The polymerization started after a few minutes. The experiment was interrupted after 3 hours by pressure release. After drying, 3.6 kg of a freely flowing polymer were obtained having an apparent density of 530 g/l. The polymer grains were translucent, the RSV value was found to be 2 dl/g. By a 16 hour extraction with heptane a soluble fraction of 2.6% by weight was found. The product has a ball indentation hardness of 800 kg/cm$^2$ (DIN 53 456).

EXAMPLE 5

5 mmoles ($TiCl_3$) of the olive green suspension according to Example 1, A 1) and A 2) were suspended, with the exclusion of air and humidity, in 500 ml of the gasoline fraction and 10 mmoles aluminum diethyl monochloride and 1 mmole cycloheptatriene-1,3,5 were added. The reaction mixture was then stirred for 1 hour at room temperature.

A 2 liter vessel with stirrer, thermometer and gas inlet was charged with 1 l of the hydrogenated, oxygen-free gasoline fraction (b.p. 140° – 165° C) and flushed with pure nitrogen. At a temperature of 50° C the suspension described above was added and 200 g of 4-methylpentene-1 were dropped in over a period of 3 hours. The polymerization temperature was maintained at 55° C. The polymerization set in after a few minutes. The polymer separated in the form of a fine precipitate. When the dropwise addition was terminated the mixture was stirred for another 2 hours at 55° C. Thereafter, the polymerization was interrupted by adding 50 ml isopropanol, the mixture was stirred for 1 hour at 60° C, extracted with warm water and filtered off with suction while still hot. After thorough washing with hot gasoline and acetone and drying under reduced pessure at 70° C, 195 g of colorless poly-4-methylpentene-1were obtained. The polymer had an apparent density of 510 g/l. The mother liquor contained 0.5% by weight of soluble fraction.

EXAMPLE 6

Component A was prepared as described in Example 1, A 1) and A 2). For the after-treatment of the $TiCl_3$-containing reaction product with aluminum diethyl monochloride 1 mmole ($TiCl_3$) of the olive green suspension and 2 mmoles aluminum diethyl monochloride were added to 100 ml of the gasoline fraction and the mixture was stirred for 1 hour at room temperature.

A 1 liter glass autoclave was charged, with the exclusion of air and humidity, with 0.41 l of a hydrogenated, oxygen-free gasoline fraction (b.p. 140° – 165° C) and the hydrocarbon was saturated with propylene at 55° C. 2 mmoles of aluminum diethyl monochloride (activator, component B), 0.2 mmole cycloheptatriene-1,3,5 and the after-treated $TiCl_3$ suspension (1 mmole) were added. Hydrogen was then introduced until a pressure of 0.25 kg/cm² had been reached and during the course of 5 minutes propylene was introduced to build up a total pressure of 6 kg/cm². This pressure was maintained during the course of polymerization by adding propylene. After a time of polymerization of 2 hours the pressure in the autoclave was released and the polymer suspension was filtered off with suction. The filter cake was washed with 1 liter of hot solvent (70° C) and dried under reduced pressure at 70° C. 220 g of polypropylene insoluble in the dispersion medium were obtained. The apparent density of the freely flowing pulverulent polymer was 540 g/l, the RSV value was 2.6 dl/g and the ball indentation hardness 820 kg/cm². To determine the soluble fraction(atactic polymer) formed the polymerization mother liquor and the wash solutions were combined and evaporated to dryness under reduced pressure. 1.6 g of soluble polypropylene were found (0.76%, calculated on total polymer).

EXAMPLE 7

The $TiCl_3$-containing suspension was prepared as described in Example 1, A 1) to A 3). After the thermal treatment with n-butyl ether and cycloheptatriene-1,3,5 the liquid reaction medium was separated and the remaining solid was washed with an inert gasoline fraction.

Polymerization was carried out as described in Example 6, but with the addition of 0.2 mmole cycloheptatriene-1,3,5 (Component C). 245 g of polypropylene having an apparent density of 523 g/l, a ball indentation hardness of 780 kg/cm², an RSV value of 3.2 dl/g were obtained. The mother liquor contained 1.8% by weight of soluble polymer, calculated on total polymer.

What is claimed is:

1. In a process for the manufacture of a polymerization catalyst which comprises reacting titanium tetrachloride in an inert hydrocarbon solvent with an aluminum organic compound containing an aluminum dialkyl chloride at a temperature of from −20 to + 20° C in a molar proportion of aluminum dialkyl chloride to $TiCl_4$ of from 0.8 : 1 to 1.5 : 1, separating and washing the reaction product, subsequently thermally treating the $TiCl_3$-containing reaction product suspended in the hydrocarbon solvent in the presence of an ether (said reaction product being component A), mixing with an aluminum dialkyl halide (component B), the improvement which comprises subjecting the suspension containing the solid washed reaction product, component A, to a thermal treatment at a temperature of from 40 to 50° C in the presence of a dialkyl ether in a molar ratio of $TiCl_3$ to ether of from 1 : 0.6 to 1 : 1.2 and also in the presence of a cyclopolyene in a molar ratio of $TiCl_3$ to cyclopolyene of from 1 : 0.001 to 1 : 0.15, and then effecting an after-treatment of component A with an aluminum alkyl halide at a temperature of from 0 to 60° C in a molar ratio of aluminum alkyl halide to $TiCl_3$ of from 0.8 : to 10 : 1.

2. A process according to claim 1, wherein said after-treatment is effected on component A without prior separation of the mother liquor from the thermal treatment.

3. A process according to claim 2, wherein said after-treatment is effected in the presence of a small amount of an unsaturated compound selected from the group consisting of cyclopolyene, an olefin, and mixtures thereof at a $TiCl_3$/ unsaturated compound molar ratio of from 1 : 0.001 to 1 : 1 for the cyclopolyenes present and from 1 : 1 to 1 : 100 for the olefins present.

4. A process according to claim 1 and wherein the after-treatment is carried out in the present of an aluminum dialkyl monohalide.

5. A process according to claim 1 wherein the after-treatment is carried out in the presence of an aluminum alkyl dihalide or sesquihalide and the catalyst component A is saparated and washed with an inert hydrocarbon solvent before being subjected to said after-treatment.

6. A process according to claim 3 and wherein the unsaturated compound is selected from the group consisting of cycloheptatriene-1,3,5; cyclooctatriene-1,3,5; cyclooctatetraene-1,3,5,7 and the alkyl and alkoxy substituted derivatives thereof in which the alkyl group contains from 1 to 4 carbon atoms.

7. A process according to claim 3 and wherein the unsaturated compound is a mono-olefin selected from of the group consisting of ethylene, propylene, butene-1 and 4-methylpentene-1.

8. A process according to claim 1 further comprising as an additional catalyst component, C, a cyclopolyene as a stereoregulator, to be mixed with components A and B.

9. A process according to claim 3 further comprising as an additional catalyst component, C, a cyclopolyene as a stereoregulator.

10. A catalyst prepared by the process of claim 1.

* * * * *